(12) United States Patent
Agtuca

(10) Patent No.: US 6,467,586 B2
(45) Date of Patent: Oct. 22, 2002

(54) TIRE CHOCK PAIR

(76) Inventor: Peter Agtuca, 7867 S. 180th, Kent, WA (US) 98032

(*) Notice: Subject to any disclaimer, the term of this patent is extended or adjusted under 35 U.S.C. 154(b) by 0 days.

(21) Appl. No.: 09/851,649

(22) Filed: May 8, 2001

(65) Prior Publication Data

US 2001/0040073 A1 Nov. 15, 2001

Related U.S. Application Data

(60) Provisional application No. 60/202,591, filed on May 9, 2000.

(51) Int. Cl.$^7$ .................................................. B60T 3/00
(52) U.S. Cl. ..................................... 188/32; 188/4 R
(58) Field of Search ........................ 188/32, 36, 4 R, 188/5, 23; 293/7; 440/30, 49; D12/217

(56) References Cited

U.S. PATENT DOCUMENTS

| | | | | |
|---|---|---|---|---|
| 2,461,248 A | | 2/1949 | Wright | 188/32 |
| 2,522,328 A | | 9/1950 | Wiswell | 188/32 |
| 2,771,162 A | | 11/1956 | Marsh | 188/32 |
| 3,120,292 A | | 2/1964 | Rambat | 188/32 |
| 3,664,466 A | * | 5/1972 | Rotheiser | 188/32 |
| 3,993,167 A | * | 11/1976 | Reed | 188/32 |
| 4,186,823 A | | 2/1980 | White, Jr. | 188/32 |
| 4,399,893 A | * | 8/1983 | Switzer | 188/32 |
| 4,615,416 A | * | 10/1986 | Wilson | 188/32 |
| 4,711,325 A | | 12/1987 | Mountz | 188/32 |
| 4,828,076 A | | 5/1989 | Fox | 188/32 |
| 5,547,045 A | * | 8/1996 | Stutzman | 188/2 R |
| 5,586,621 A | | 12/1996 | Moon et al. | 188/4 |
| 5,927,443 A | * | 7/1999 | Collins, Jr. | 188/32 |

* cited by examiner

Primary Examiner—Jack Lavinder
Assistant Examiner—Mariano Sy
(74) Attorney, Agent, or Firm—Dean A. Craine

(57) ABSTRACT

An improved tire chocking system comprising a pair of triangular-shaped tire chocks connected by a semi-rigid cable securely attached to each tire chock. In the preferred embodiment, the cable includes a wire rope surrounded by a protective outer hose. The ends of the wire rope are securely attached to the chocks via stop plugs wedged or forced into longitudinally aligned bores formed in each chock. A crimp nut is attached to the distal ends of the wire rope to prevent disengagement from the stop plugs. The wire rope and hose form a semi-rigid cable that extends upward when the two tire chocks are aligned vertically on their ends to delineate a desired parking area. The three surfaces of each chock are marked with a high visibility stripe to improve visibility.

11 Claims, 1 Drawing Sheet

TIRE CHOCK PAIR

This is a utility patent application based on a provisional patent application (Ser. No. 60/202,591) filed on May 9, 2000.

BACKGROUND OF THE INVENTION

1. Field of the Invention

This invention pertains to tire chocks wedged between the outer surface of a tire and the roadway to prevent the motor vehicle from rolling over the roadway, and, more particularly, to a pair of interconnected tire chocks that is placed in front and behind the tire.

2. Description of the Related Art

Tire chocks are widely used in the trucking industry to prevent a truck from rolling when parked and left unattended. In instances where the truck can roll in either direction, a pair of tire chocks is used around a tire with one chock placed in front of and one chock behind the tire. When a pair of tire chocks is desired, the chocks are usually connected together with a short rope that enables the chocks to be easily pulled away from the tire and transported. The rope also acts as a hanging means for storing the pair of chocks on a hook in the storage area.

At airport terminals, an interconnected pair of tire chocks is commonly used to prevent unattended, lightweight luggage carrying vehicles, called tugs, from rolling over the runway or aircraft parking areas. Although some tugs have hand brakes, it is desirable to place a pair of tire chocks around the tug's tires to prevent the tug from rolling in either direction while loading and unloading luggage, or when the tug is located downwind from an aircraft's engine. Rope is used to connect the two chocks because it is easy to handle and has poor electrical conduction properties.

When rope is used to connect two tire chocks together, the ends of the rope are threaded through a longitudinally aligned bore formed in each chock. Large knots are tied into the ends of the rope to prevent the ends of the rope from disengaging from the chocks. During use, the chocks may become tightly wedged between the tire and the ground, requiring the user to exert a large force on the rope to pull the tire chocks away from the tire. Eventually, one of the knots is pulled through the bore of a chock, disengaging it. When a chock becomes disengaged, it may be left on the runway or parking area where it may be run over by another tug causing luggage to fall off the tug, or a serious accident. Even when a disengaged chock is retrieved, both chocks in the pair are normally discarded because of the difficulty involved in untying the knot and threading the frayed end of the rope back through the bore of the disengaged chock.

In some instances, tire chock pairs are used to mark or indicate the parking or loading area where a truck or tug should be parked for loading or unloading cargo. Usually, the tire chocks are horizontally aligned on one side of the parking lane. Unfortunately, when horizontally aligned, they are not visible at great distances or at night. They cannot be vertically aligned on one end because of the knots protruding from the ends of the chocks.

What is needed is a pair of tire chocks that is more securely connected together for use around airports. What is also needed is a pair of tire chocks with flat ends that enable the chocks to be vertically aligned on a horizontal surface. What is also needed is a pair of tire chocks that uses sufficiently rigid cable that extends upward from the ends of the chocks when the chocks are vertically aligned to improve the visibility of the chocks.

SUMMARY OF THE INVENTION

It is an object of the present invention to provide a pair of tire chocks connected with a rope or cable more securely than tire chocks found in the prior art.

It is another object of the invention to provide such a pair of tire chocks in which the means to connect the pair of tire chocks is lightweight, easy to handle, and safe for uses around aircraft.

It is a further object of the invention to provide such a pair of tire chocks that can be vertically aligned on one end with a sufficiently rigid interconnecting cable that extends upward from the inner ends of the tire chocks to make the chocks more visible.

These and other objects of the invention that will become apparent are met by an improved tire chock pair that utilizes two triangular-shaped tire chocks with flat outer ends that are connected together by a semi-rigid cable. Each tire chock includes a longitudinally aligned bore with one end of the cable securely connected therein. In the preferred embodiment, the cable comprises a wire rope with its exposed surfaces covered with protective rubber hose for greater comfort when handled and lower electrical conductivity. Securely attached to the opposite ends of the wire rope is a stop plug that, during manufacturing, is securely pressed onto the bores on the tire chocks to prevent disengagement. In the preferred embodiment, each bore includes a wider, concentrically aligned wider diameter bore designed to receive the end of the hose.

The cable has sufficient length so that the two tire chocks can be placed in a parallel alignment in front of and behind a tire. The wire rope and hose also have sufficient rigidity so that the cable extends upward from the inner ends of the two tire chocks when the tire chocks are vertically aligned on-their outer end surfaces on a horizontal surface to make the tire chocks more visible. The outer surfaces of the chocks and hose may be covered with a highly reflective paint or tape to make the tire chock system more visible at night.

DESCRIPTION OF THE PREFERRED EMBODIMENT(S)

Figure 1:
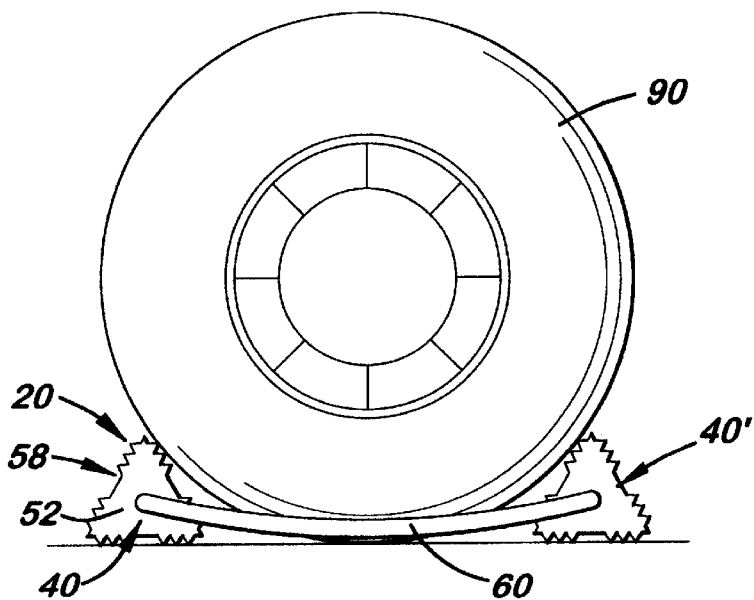
FIG. 1 is a front elevational view of the improved tire chock pair.
Figure 2:
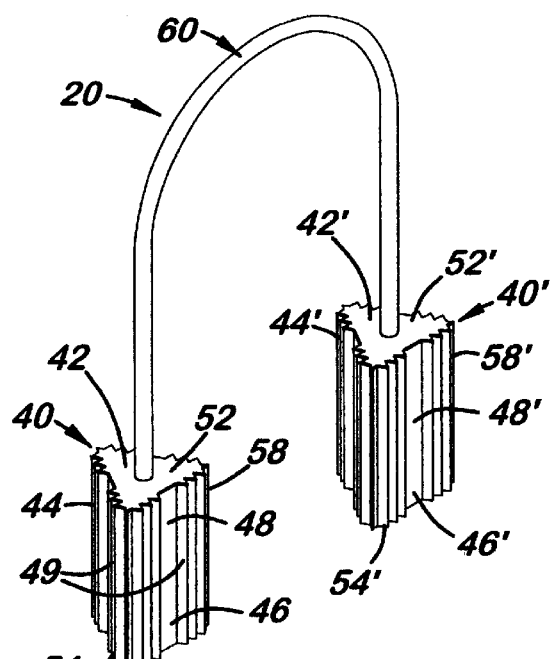
FIG. 2 is a perspective view of the improved tire chock pair.
Figure 3:
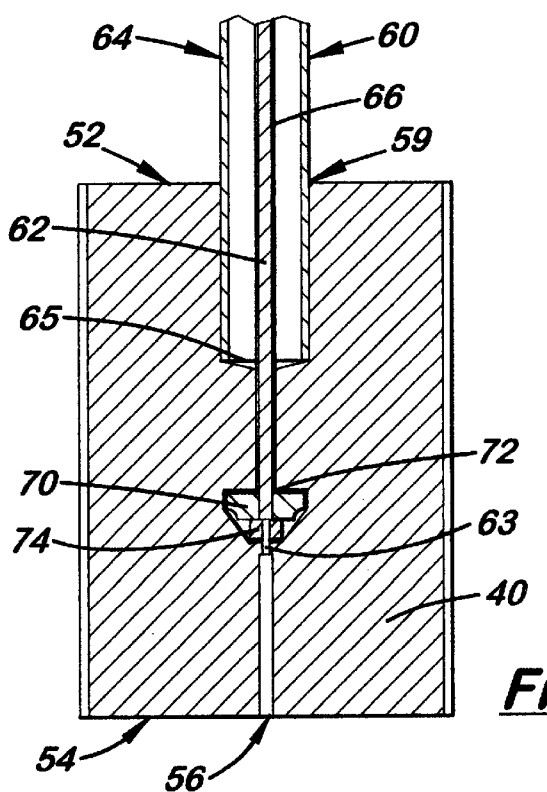
FIG. 3 is a sectional, side elevational view of a tire chock pair.

Referring to the accompanying FIGS. 1–3, there is shown and described an improved tire chocking system 20 comprising a pair of tire chocks 40, 40' connected together by a semi-rigid cable 60. The cable 60 is longitudinally aligned between the two chocks 40, 40' and is sufficient in length so that the chocks 40, 40' may be disposed in a parallel alignment in front and behind a standard-sized truck tire 90.

In the preferred embodiment, each chock 40, 40' is triangularly-shaped and has three, equal-sized, diagonally aligned surfaces 42, 44, 46, and 42', 44', 46' and two parallel proximal and distal ends 52, 54, and 52', 54', respectively. Formed on each surface 42, 44, 46, and 42', 44', 46' of the chocks 40, 40' is a plurality of transversely aligned treads 58, 58', respectively. Also, formed longitudinally and centrally on each surface 42, 44, 46, and 42', 44', 46' is a recessed surface 48, 48' that receives an optional, visible, highly reflective tape 49. In the preferred embodiment, each chock 40, 40' is made of rubber with each surface 42, 44, 46 and 42', 44', 46' measuring approximately 4 inches in width and 8 inches in length.

Formed centrally and longitudinally inside each chock 40, 40' is a fully extending bore 56 shown more clearly in FIG. 3. In the preferred embodiment, each bore 56 is approximately ⅞ inch in diameter. Also, in the preferred embodiment, each bore 56 includes a concentrically aligned wider bore 59 designed to receive the end of the cable 60 that extends into the chocks 40, 40'.

Attached to the opposite ends 63 of the cable 60 are stop plugs 70 that are forced into the bores 56 during assembly. The stop plugs 70 are wedged approximately ⅔ the distance from the top surface 52 to the bottom surface 54 of the chock 40. Approximately 2,000 lbs of force must be exerted to force the stop plugs 70 into the bores 56. In the preferred embodiment, the cable 60 comprises a wire rope 62 partially covered by an insulative outer cover or hose 64 made of rubber or latex. The hose 64 protects the workers' hands as he or she holds and pulls on the cable 60. The hose 64 also acts as an insulated layer to prevent conduction of static electricity between the wire rope 62 and the aircraft, which is required by FAA regulations. In the preferred embodiment, the wire rope 62 is approximately 3/16 inch in diameter, 45 inches in length, and has an optional ⅛ inch vinyl coating 66 formed thereover to provide further protection. The ends 65 of the hose 64 extend approximately 3 inches into the wide bores 59.

As shown in FIG. 3, the stop plug 70 is conical-shaped and made of aluminum. In the preferred embodiment, the stop plug 70 includes a lower beveled edge that enables it to be more easily forced downward into the bore 56. The beveled edges also hinder its upward movement in the bore 56. When substantial force is exerted to force to the stop plug 70 into the bore 56, the surrounding chock material is sufficiently resilient to collapse around the stop plug 70 to securely hold the stop plug 70 inside the chock 40. A longitudinally aligned bore 72 is formed in the stop plug 70 that enables the end 63 of the wire rope 62 to extend therethrough. A crimp nut 74 is then forcibly attached to the end 63 of the wire rope 62 that extends beyond the stop plug 70 to prevent slippage.

In the preferred embodiment, the hose 64 is approximately 1 inch in diameter, 38 inches in length, and made of rubber, vinyl or latex. During assembly, the hose 64 is first placed over the wire rope 62 before the ends 63 of the wire rope 62 are extended partially or completely through the chocks 40, 40'. The stop plugs 70 and crimp nuts 74 are then attached to the ends of the wire rope 62. The stop plugs 70 are then forced into the bores 56. When the stop plugs 70 are properly positioned inside the chocks 40, the ends 65 of the hose 64 are forced 2 to 3 inches into the wider bores 59 so that the wire rope 62 is completely covered. Because no components protrude from the distal ends 54, 54' of the chocks 40, 40', the chocks 40, 40' may then be vertically aligned so that they stand on their distal ends 54, 54'.

It should be understood that the size and shape of the tire chocks 40, 40' and the diameter and length of the cable 60 disclosed herein are representative, and may be adjusted for certain uses.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An improved tire chock system, comprising:
   a. two tire chocks, each said tire chock having side walls and a perpendicularly aligned flat distal end, said distal end being sufficient shape and size to allow said chock to be vertically aligned in an upright position;
   b. an insulated cable that extends from and connects said tire chocks together, said cable having sufficient rigidity to extend upward from said tire chocks when said tire chocks are vertically aligned on their said distal ends; and,
   c. means to securely connect ends of said cable inside said chocks.

2. The improved tire chock system, as recited in claim 1, wherein said insulated cable includes a wire rope enveloped by an outer hose.

3. The improved tire chock system, as recited in claim 2, wherein said outer hose has a reflective outer surface.

4. The improved tire chock system, as recited in claim 2, wherein said means to securely connect ends of said wire rope to said chocks is a longitudinally aligned bore with a stop plug connected to the end of said wire rope and wedged within said bore of said chock.

5. The improved tire chock system, as recited in claim 1, further including reflective paint on said side walls of each said chock.

6. The improved tire chock system, as recited in claim 1, wherein each said tire chock is triangular in cross-section.

7. The improved tire chock system, as recited in claim 2, wherein said wire rope is approximately 3/16 inch in diameter and said hose is approximately ⅞ inch in diameter.

8. An improved tire chock system, comprising:
   a. two tire chocks, each said tire chock being triangular in cross-section with three side walls and a perpendicularly aligned flat distal end, said distal end being sufficient shape and size to allow said chock to be vertically aligned in an upright position, each said tire chock being made of insulating material;
   b. a wire rope connected at its opposite ends to said chocks, said wire rope having an insulative outer cover; and,
   c. means to securely connect the opposite ends of said wire rope inside each said chock.

9. The improved tire chock system, as recited in claim 8, wherein said means to securely connect ends of said wire rope to said chocks is a longitudinally aligned bore with a stop plug connected to the end of said wire rope and wedged therein.

10. The improved tire chock system, as recited in claim 8, wherein said insulative outer covering is a hose disposed around said wire rope.

11. The improved tire chock system, as recited in claim 9, further included a wide diameter bore concentrically aligned with said bore on each said chock to receive an end said insulative outer cover.

* * * * *